United States Patent
Belmonte et al.

(10) Patent No.: US 8,977,290 B2
(45) Date of Patent: Mar. 10, 2015

(54) METHOD AND DEVICE FOR CONSOLIDATING LOCATION-DEPENDENT INFORMATION IN A RADIO ACCESS NETWORK

(71) Applicant: Motorola Solutions, Inc., Schaumburg, IL (US)

(72) Inventors: John P. Belmonte, Schaumburg, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 86 days.

(21) Appl. No.: 13/766,875

(22) Filed: Feb. 14, 2013

(65) Prior Publication Data

US 2014/0228045 A1      Aug. 14, 2014

(51) Int. Cl.
  *H04W 4/02*        (2009.01)
  *H04W 4/18*        (2009.01)
(52) U.S. Cl.
  CPC ............... *H04W 4/02* (2013.01); *H04W 4/021* (2013.01); *H04W 4/18* (2013.01)
  USPC ..................................... 455/456.1; 455/456.3
(58) Field of Classification Search
  CPC ....... H04W 4/12; H04W 4/22; H04W 76/007; H04W 64/00; H04W 4/02
  USPC ..................... 455/404.2, 414.2, 456.1–3, 457
  See application file for complete search history.

(56) References Cited

U.S. PATENT DOCUMENTS

| | | | |
|---|---|---|---|
| 5,432,542 A | 7/1995 | Thibadeau | |
| 6,112,074 A | 8/2000 | Pinder | |
| 6,836,667 B1 | 12/2004 | Smith, Jr. | |
| 7,142,869 B2 | 11/2006 | Juppi et al. | |
| 7,336,778 B2 * | 2/2008 | Partanen et al. | 379/211.02 |
| 7,535,873 B1 * | 5/2009 | Sigg | 370/332 |
| 7,565,153 B2 | 7/2009 | Alcock et al. | |
| 8,264,345 B2 | 9/2012 | Baron, Sr. et al. | |
| 8,374,625 B2 * | 2/2013 | Wang et al. | 455/456.1 |
| 8,391,872 B1 * | 3/2013 | Shetty et al. | 455/443 |
| 8,639,263 B2 * | 1/2014 | Salmon | 455/456.1 |
| 2003/0069002 A1 | 4/2003 | Hunter et al. | |
| 2005/0216341 A1 * | 9/2005 | Agarwal et al. | 705/14 |
| 2007/0049260 A1 | 3/2007 | Yuhara et al. | |
| 2007/0237096 A1 | 10/2007 | Vengroff et al. | |
| 2010/0056183 A1 * | 3/2010 | Oh | 455/456.3 |
| 2014/0057645 A1 * | 2/2014 | Chowdhary et al. | 455/456.1 |

FOREIGN PATENT DOCUMENTS

| | | |
|---|---|---|
| EP | 2166788 A1 | 3/2010 |
| WO | 2007070505 A2 | 6/2007 |

OTHER PUBLICATIONS

PCT International Search Report Dated May 2, 2014 for Counterpart Application PCT/US2014/015233.

* cited by examiner

*Primary Examiner* — Cong Tran
(74) *Attorney, Agent, or Firm* — Daniel R. Bestor

(57) ABSTRACT

A process for consolidating location-dependent information in a two-way radio system includes determining a geographic location of each subscriber unit in a group of subscriber units active within a radio frequency (RF) coverage area of a base station (BS), determining a single representative geographic location for the group of subscriber units based on their geographic locations, requesting location-dependent information from a content provider using the representative geographic location, and causing the location-dependent information to be broadcast within the RF coverage area.

20 Claims, 5 Drawing Sheets

METHOD AND DEVICE FOR CONSOLIDATING LOCATION-DEPENDENT INFORMATION IN A RADIO ACCESS NETWORK

FIELD OF THE DISCLOSURE

The present disclosure relates to digital radio communication systems, in general, and to consolidating location-dependent information in a radio access network (RAN) in particular.

BACKGROUND OF THE DISCLOSURE

Radio access networks (RANs) provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, repeater, and/or access point. Such a RAN typically includes a system infrastructure which generally includes a network of various fixed terminals, which are in direct radio communication with the subscriber units. Each of the fixed terminals operating in the RAN may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the RAN are made via respective serving fixed terminals. Sites of neighbouring fixed terminals may be offset from one another or may be non-overlapping or partially or fully overlapping.

RANs may operate according to an industry standard protocol such as, for example, the Project 25 (P25) standard defined by the Association of Public Safety Communications Officials International (APCO) and standardized under the Telecommunications Industry Association (TIA), or other radio protocols, such as the terrestrial trunked radio (TETRA) standard defined by the European Telecommunication Standards Institute (ETSI) or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in RANs such as those set forth above send user communicated speech and data, herein referred to collectively as 'traffic information', in accordance with the designated protocol.

Many so-called 'public safety' RANs provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force group.

In addition to emergency responders, other types of subscribers and groups may be serviced by RANs, including for example, electrical utilities, water or sewer utilities, retailers, and railroad workers, among other types. Such mobile subscribers operating in RANs may be interested in location-dependent information, such as weather, traffic, or real-time events or reports (such as AMBER alerts or all points bulletins (APBs). For example, information regarding current and future environmental conditions, especially useful for outdoor workers such as utility and railroad workers, is an often requested location-dependent piece of information used for scheduling and preparedness, among other types of location-dependent data.

In one example, and more specifically, a delivery man using a subscriber unit operating in a RAN may need to know when snow is expected to start so that he or she can plan their route accordingly, a construction worker using a subscriber unit operating in a RAN may need to know which day of the week it is not going to rain so that he or she can schedule jobs appropriately, a pipeline worker using a subscriber unit operating in a RAN may need to know how long he or she has until the sun sets so it can be determined whether to start work on a new section of pipe or not, or a road maintenance supervisor using a subscriber unit operating in a RAN may need to know if it is going to be over 100 degrees come noon time so that he or she can know whether to proceed with a heat-sensitive portion of the job, such as paving a new section of road.

Knowing this information in the field may be operationally advantageous, and may conventionally be acquired via a separate device and separate high-bandwidth radio channel, such as via a personal cell phone operating on a 4G network, separate from a two-way radio subscriber unit that the operator uses to communicate with colleagues.

Conventional subscriber units, such as two-way radios operating in a trunked or conventional RAN, are generally limited in terms of data bandwidth. Often in such RANs, data traffic must share a limited number of narrowband channels with voice traffic, and multiple individual requests for weather data, or other types of location-dependent information, from multiple devices in any particular group of subscriber units could quickly consume all or most available bandwidth at the RAN, negatively impacting voice and other services provided in the RAN.

In addition to bandwidth concerns, many commercial weather data services, amongst other location-dependent information content providers, charge a fee per request. Allowing each individual subscriber unit in a group of subscribers to request weather data at their own desired frequency could lead to substantial additional and undesired charges from the content provider. Therefore, there is a need for an improved method and device for consolidating location-dependent information in a RAN.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

As set forth above, there is a need for an improved method and device for consolidating location-dependent information in a RAN.

According to a first embodiment of the present disclosure, a process for consolidating location-dependent information in a two-way radio system includes determining a geographic location of each subscriber unit in a group of subscriber units active within a radio frequency (RF) coverage area of a base station (BS), determining a single representative geographic location for the group of subscriber units based on their geographic locations, requesting location-dependent information from a content provider using the representative geographic location, and causing the location-dependent information to be broadcast within the RF coverage area.

According to a second embodiment of the present disclosure, a two-way radio system infrastructure device for consolidating location-dependent information in a two-way radio system, the device comprising: a memory, a transceiver, and a processor configured to: determine a geographic location of each subscriber unit in a group of subscriber units active within an RF coverage area of a BS, determine a single representative geographic location for the group of subscriber units based on the geographic locations of each subscriber unit, request, from a content provider, location-dependent information using the representative geographic location, and cause the location-dependent information to be broadcast within the RF coverage area.

Each of the above-mentioned embodiments will be discussed in more detail below, starting with example network and device architectures of the system in which the embodiments may be practiced, followed by a discussion of location-dependent information consolidation from the point of view of a radio controller and then from a system perspective. Further advantages and features consistent with this disclosure will be set forth in the following detailed description, with reference to the figures.

I. Network and Device Architectures

Figure 1:
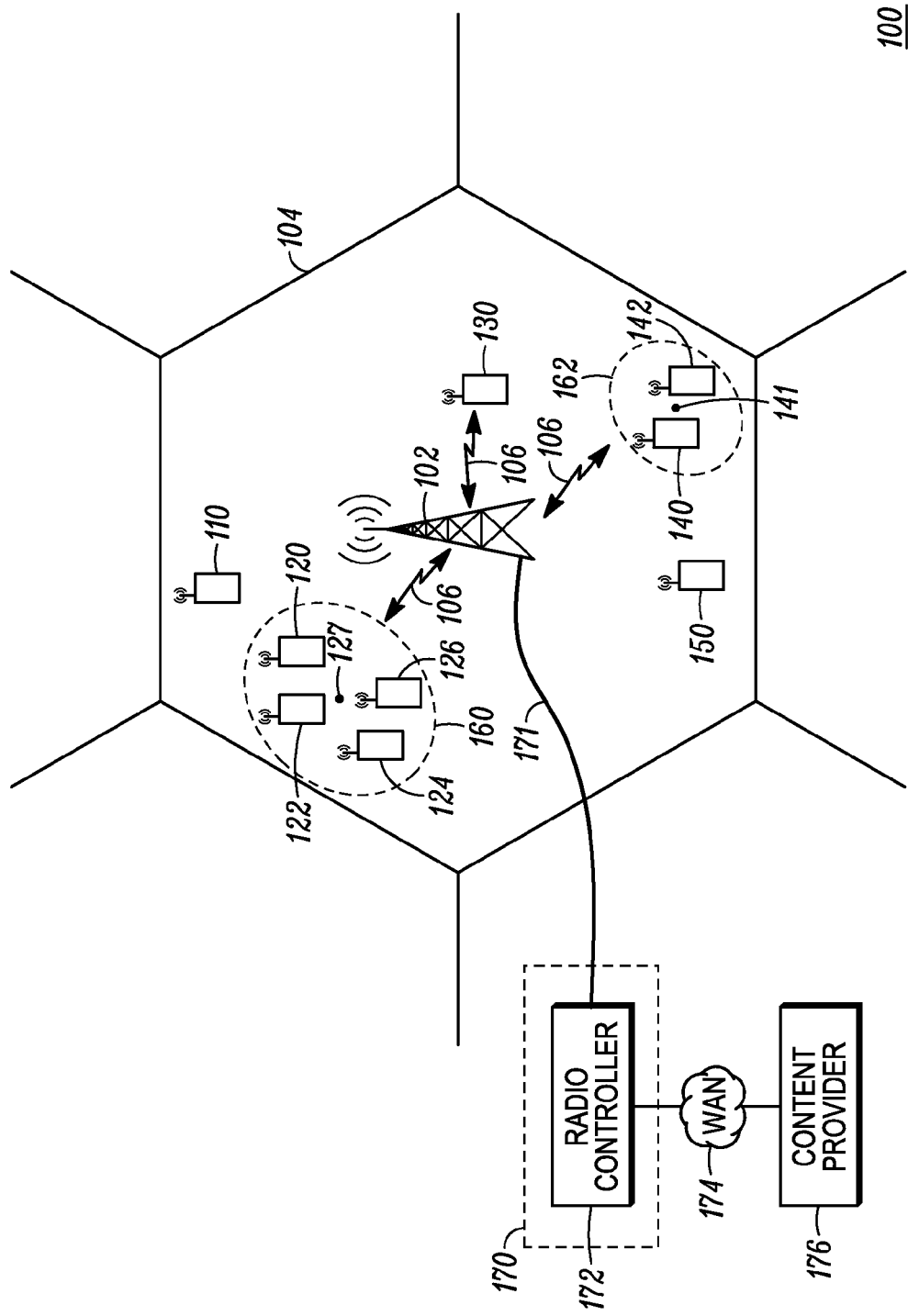
FIG. 1 is a first schematic illustration of a radio communication system operating in accordance with an embodiment.

Referring to FIG. 1, one embodiment of a wireless communication system 100 according to the present disclosure is shown. It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 includes a fixed terminal (e.g., base station/repeater/control terminal) (BS) 102 having a corresponding radio site (e.g., coverage area) 104 over which wireless communication services are provided, and which may be operably connected to a system infrastructure 170 including a radio controller 172 via a wired or wireless link 171. While the term BS will be used to refer to the fixed terminals, for ease of reference, it should be noted that the fixed terminals may, in some embodiments, be a repeater, or a control terminal, or some other type of fixed terminal. The BS 102 may have radio links 106 with a plurality of subscriber units, particularly subscriber units (SUs) in the radio site. The radio controller 172 may be, for example, a zone controller, a mobile switching center, or a serving gateway, and may provide a signalling path between BSs and an external network and may act to manage resources (such as conventional, control, and/or traffic channels) at BSs under its control. The radio controller 172 may also function to consolidate location-dependent information in according with embodiments disclosed herein, and may provide other functions to the BSs and/or SUs as well. In general, the BS 102 and system infrastructure 170, together, is considered to be a radio access network (RAN).

The BS 102 and corresponding radio site 104 may operate as a conventional or trunked narrowband radio site. In a conventional radio system, a plurality of SUs are formed into groups. Each group uses an associated narrowband channel (shared or separate) for communication. Thus, each group is associated with a corresponding channel, and each channel can only be used by one group at any particular moment in time. Channels may be divided by frequency, time, and/or code. In some systems, multiple groups may operate on the same channel, and may use a unique group ID embedded in the group communications to differentiate them. In a trunked radio system, SUs use a pool of channels for virtually an unlimited number of groups. Thus, all groups are served by all channels. For example, in a trunking system, all SUs operating at a radio site idle on a designated control channel or rest channel and when a new call is requested over the control or rest channel, is assigned a new traffic channel for the new group call while remaining SUs not participating in the new group call stay on the designated control channel or rest channel. In other trunking configurations, all SUs operating at a radio site idle on a designated control channel or rest channel and when a new call is requested over the control or rest channel, the new call is assigned to the control channel (converting to acting as the traffic channel for the new group call), while remaining SUs not participating in the new group call move to a new designated control channel or rest channel. Other conventional and trunked configurations are possible as well.

A plurality of SUs 110-150 are illustrated in FIG. 1 as operating within the wireless communication system 100, and specifically within the radio site 104. In other embodiments, fewer or more SUs may be active in radio site 104.

In the example set forth in FIG. 1, BS 102 serves SUs 110-150 within its coverage area 104 with radio communications to and from other terminals, the other terminals including (i) SUs served by the same BS (e.g., BS 102), (ii) SUs (not shown) served by other BSs, and (iii) other terminals including SUs in other systems (not shown) operably linked to the system 100 via the system infrastructure 170 and/or the WAN 174.

System infrastructure 170 supporting BS 102 and perhaps other BSs, in addition to radio controller 172, may include known sub-systems (not shown) required for operation of the system 100. Such sub-systems may include, for example, sub-systems providing authentication, routing, SU registration and location, system management and other operational functions within the system 100, some of which may be provided by radio controller 172. The system infrastructure 170 may additionally provide routes to other BSs (not shown) providing radio sites serving other SUs, and/or may provide access to other types of networks such as a plain old telephone system (POTS) network (not shown) or a data-switched network (wide area network (WAN) 174) such as the Internet.

A number of various content providers may be accessible via the WAN 174, including for example, weather information providers, traffic information providers, service provider information providers (e.g., such as restaurants, gas stations, banks, etc.), and active event information providers (such as police, fire, or special event organizations).

For the purpose of illustrating methods and devices for consolidating location-dependent information, FIG. 1 illustrates two groups of SUs, including a first talkgroup 160 of SUs 120-126 and a second talkgroup 162 of SUs 140-142. A talkgroup is a group of radios that are assigned a group identifier and/or assigned to a particular channel to enable communications to be transmitted between group members (e.g., one to many) in a quick and efficient manner. In this case, a transmission from SU 120, for example, using an identifier assigned to the first talkgroup 160 or on a channel assigned to the first talkgroup 160 would be duplicated and re-broadcast at BS 102 so that all other SUs subscribed to the first talkgroup (SUs 122-126) could receive the transmissions from SU 120 substantially simultaneously.

Figure 2:
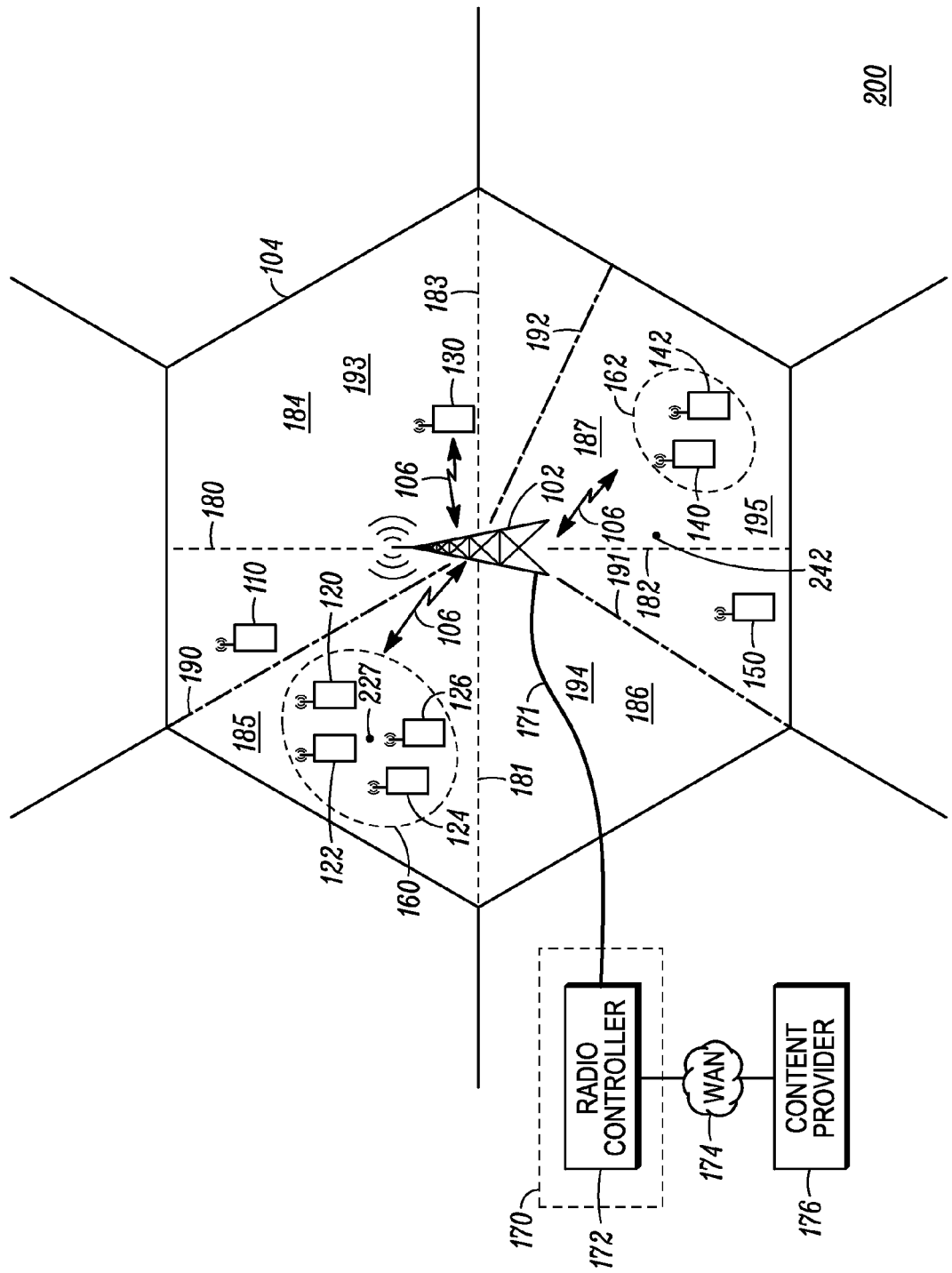
FIG. 2 is a second schematic illustration of a radio communication system operating in accordance with an embodiment.

Furthermore, and also for the purpose of illustrating methods and devices for consolidating location-dependent information, FIG. 2 illustrates two different ways in which the radio site 104 may be logically or physically divided into sectors or quadrants to aid in the consolidation of location-dependent information within the radio site 104. FIG. 2 uses same or similar reference numbers as FIG. 1 where possible. In one embodiment, the radio site 104 may be physically divided into sectors or quadrants by using, for example, different corresponding channels for each sub-divided area, perhaps using directional antennas as well. In another embodiment, the BS 102 or radio controller 172 may logically divide the radio site 104 into sector or quadrants, while still broadcasting information to SUs 110-150 omni-directionally. As illustrated in FIG. 2, and in one embodiment, the radio site 104 may be divided into four quadrants via dividing lines 180, 181, 182, and 183, forming four quadrants 184, 185, 186, and 187. As shown, SU 130 operates in quadrant 184, SUs 110-126 operate in quadrant 185, SU 150 operates in quadrant 186, and SUs 140-142 operate in quadrant 187. The radio controller 172 may store information relating to the geographic coordinates/axes of lines 180-183 and compare the stored geographic coordinates of the lines with determined geographic locations of the SUs in radio site 104 to determine which quadrant each SU is currently active in.

Alternatively, the radio site 104 may be divided into three sectors via dividing lines 190, 191, and 192, forming three sectors 193, 194, and 195. As shown, SUs 110 and 130 operate in sector 193, SUs 120-126 operate in sector 194, and SUs 140-150 operate in sector 195. Similarly, the radio controller 172 may store information relating to the geographic coordinates/axes of lines 190-192 and compare the stored geographic coordinates of the lines with determined geographic locations of the SUs in radio site 104 to determine which sector each SU is currently active in. Of course, in other embodiments, radio site 104 may be divided into more than four area or less than three areas.

Figure 3:
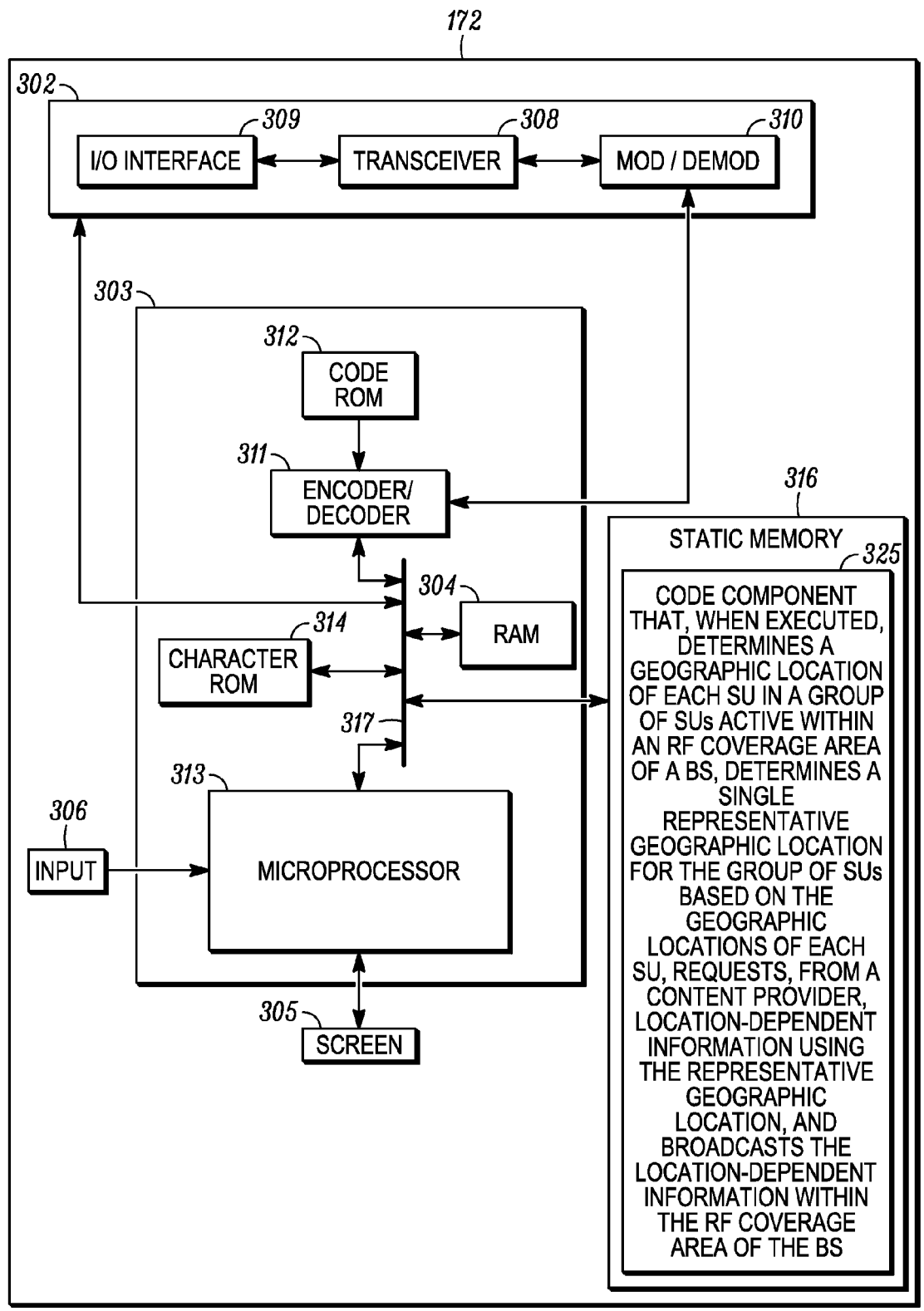
FIG. 3 is a block diagram of a radio controller computing device capable of operating in the communication system of FIGS. 1 and 2 in accordance with an embodiment.
Figure 4:
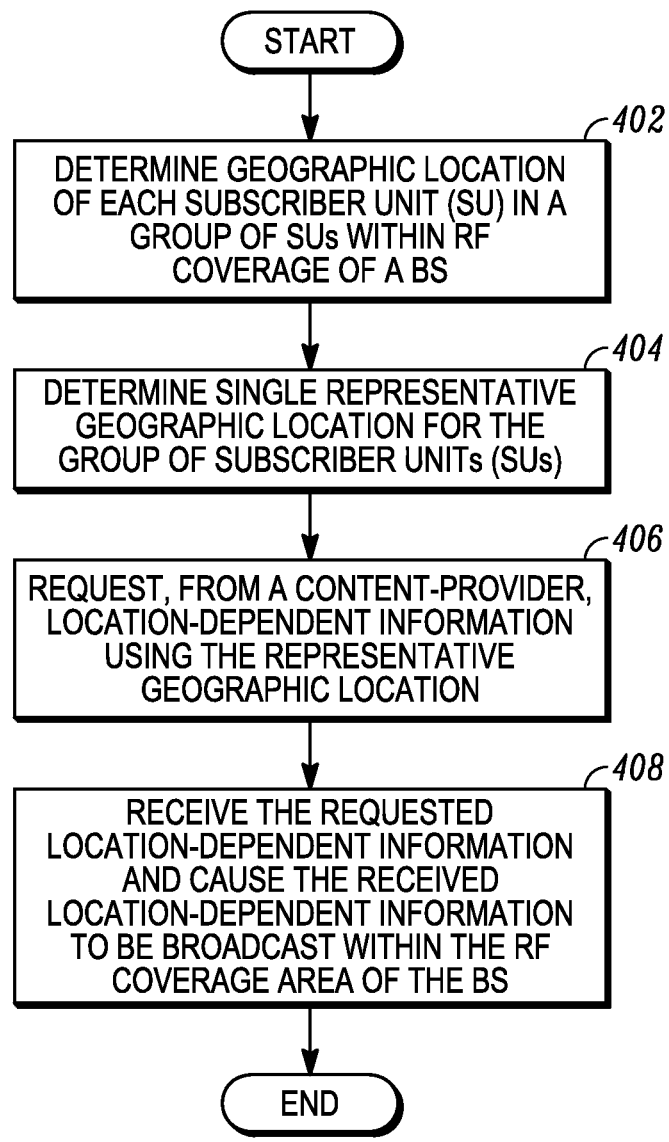
FIG. 4 is a flow chart illustrating a method of consolidating location-dependent information in a RAN in accordance with an embodiment.
Figure 5:
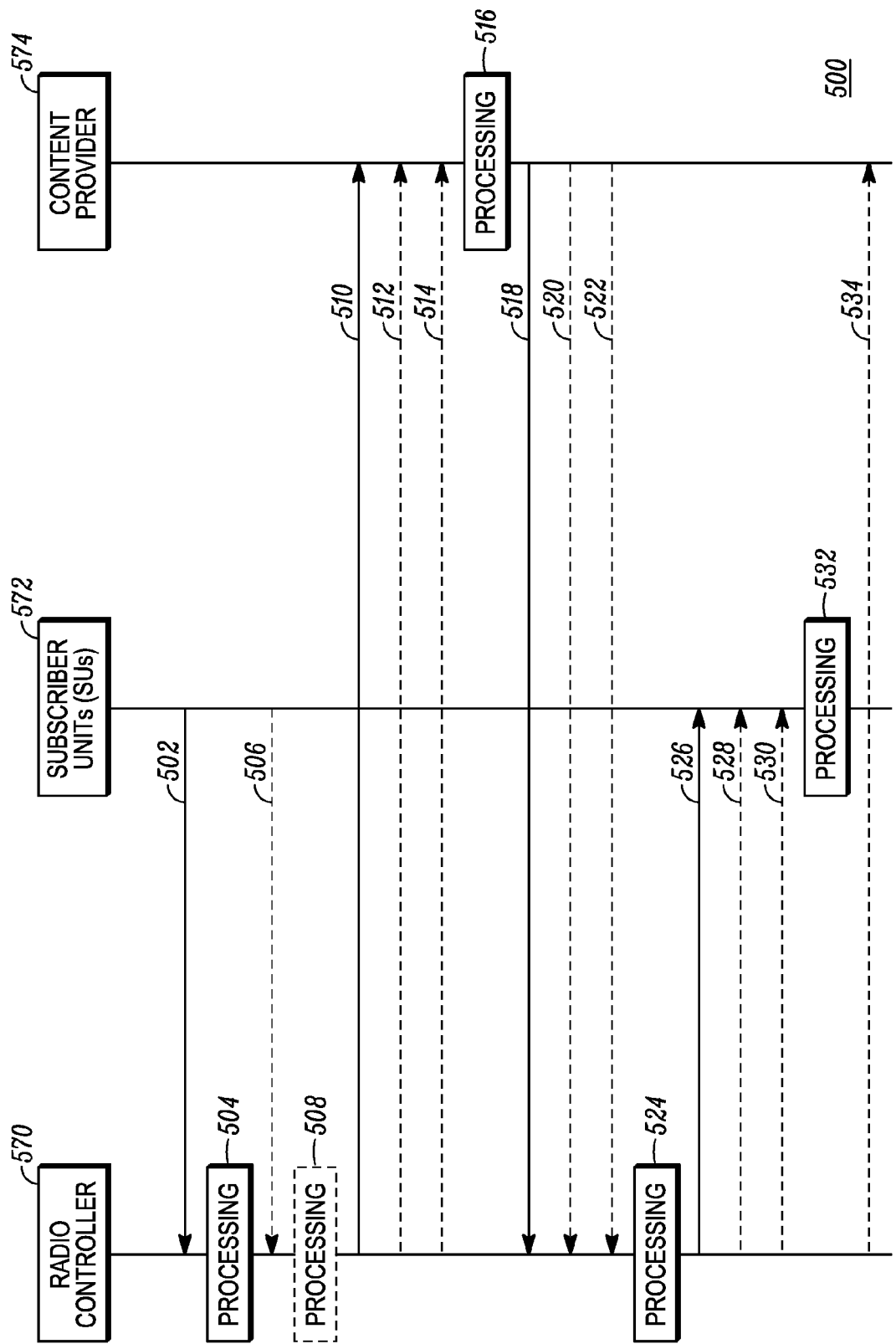
FIG. 5 is a ladder diagram illustrating an example message flow for consolidating location-dependent information in a RAN in accordance with an embodiment.

FIG. 3 will next illustrate a functional block diagram of a structure of the radio controller 172, after which FIG. 4 will illustrate a process flow, executable at radio controller 172, for consolidating location-dependent information in a RAN, and FIG. 5 will illustrate a message flow diagram showing system-level messaging flows between the SUs 110-150, BS 102, radio controller 172, and content provider 176 for consolidating location-dependent information in a RAN, both with reference to the network diagrams of FIGS. 1 and 2.

FIG. 3 is an example functional block diagram of a radio controller such as radio controller 172 that may operate within the system 100 of FIG. 1 or system 200 of FIG. 2 in accordance with some embodiments. As shown in FIG. 3, radio controller 172 includes a communications unit 302 coupled to a common data and address bus 317 of a processing unit 303. The radio controller 172 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between other BSs or SUs in the system 100, or perhaps between content providers directly or indirectly (e.g., via WAN 174) coupled to the radio controller 172. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with SUs such as SUs 110-150, with BSs such as BS 102, and/or with content providers such as content provider 176. The communications unit 302 may include one or more wireless transceivers 308, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The communications unit 302 may additionally or alternatively include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding and/or encoding data such as location and/or bearing information, activation or de-activation messages, other control signalling, and/or data or voice messages that may be transmitted or received by the radio controller 172. Static memory 316 may store operating code for the microprocessor 313 that, when executed, determines a geographic location of each SU in a group of SUs active within an RF coverage area of a BS, determines a single representative geographic location for the group of SUs based on the geographic locations of each SU, requests, from a content provider, location-dependent information using the representative geographic location, and broadcasts the location-dependent information within the RF coverage area of the BS, in accordance with one or more of FIGS. 4-5 and corresponding text. Static memory 316 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

II. Location-Dependent Information Consolidation Process and Message Flows

FIGS. 4 and 5 set forth example processing and message flows for consolidating location-dependant information in a RAN in accordance with some embodiments. In the examples set forth in detail below, only particular sequences are disclosed with respect to the radio controller. Of course, additional steps not disclosed herein could be additionally added before, after, or in-between steps or messages disclosed in FIGS. 4 and 5, and the presence of such additional steps would not negate the purpose and advantages of the examples set forth in detail throughout the remainder of this disclosure. Steps drawn with a dashed outline in FIGS. 4 and/or 5 should be understood to be optional steps. Further details regarding the process and message flows will be first set forth with regard to the process flow diagram of FIG. 4, and then the message flow diagram of FIG. 5, further below.

FIG. 4 sets forth a method 400 executable at a radio controller, such as radio controller 172 of FIGS. 1 and/or 2, for consolidating location-dependent information in a RAN, in accordance with an embodiment.

At step 402, the radio controller determines a geographic location of each SU in a group of radios within RF coverage of a BS. The geographic location may be calculated by each SU itself, or by one or more BSs within transmission range of each SU, and provided to the radio controller in separate or aggregated transmission(s). For example, and with respect to FIG. 1, each SU 110-150 operating within radio site 104 may calculate its geographic location, perhaps using a satellite-based triangulation process (perhaps via a GPS receiver or application, or similar satellite-based system such as GLONASS, GNSS, or Compass) or via a terrestrial-based triangulation process, and provide the calculated geographic location to radio controller 172 via BS 102. In some embodiments, each SU within radio site 104 may be configured to periodically or intermittently provide its geographic location to radio controller 172. In other embodiments, each SU within radio site 104 may be polled by radio controller 172 or requested, via broadcast or individual message, to provide its current geographic location, perhaps as part of the SU registration process, and the geographic location provided to radio controller 172 in response to the polling or request.

The radio controller may then group all active SUs within a single radio site, such as SUs 110-150 in radio site 104, into a single group, or segregate the SUs into separate groups based on some preconfigured algorithm and/or parameter. For example, and as set forth in FIG. 1, the radio controller may segregate SUs 120-126 into a separate group of SUs based on their membership to talkgroup 160. Similarly, the radio controller may segregate SUs 140-142 into another separate group of SUs based on their membership to talkgroup 162. The remaining SUs, including SUs 110, 130, and 150 in FIG. 1 for example, may then be grouped into a single group, or grouped into separate groups of which they are the only member.

Additionally or alternatively, and as set forth in FIG. 2, SUs may be grouped based on their location within radio site 104. For example, in an embodiment in which radio site 104 is physically or logically divided into four quadrants 184, 185, 186, and 187, SU 130 may be grouped into its own single-member group based on its location within quadrant 184, SUs 110-126 may be grouped into a single group based on their location within quadrant 185, SU 150 may be grouped into its own single-member group based on its location within quadrant 186, and SUs 140-142 may be grouped into a single group based on their location within quadrant 187. Similar divisions may be made based on SU location within one of the three sectors 193, 194, and 195.

Of course, in some embodiments, SUs may be grouped based on more than one parameter, such as talkgroup membership and location, such that SUs 120-126 are grouped together based on their subscription to a same talkgroup, and SUs 110-126 are separately grouped together based on their location in a same quadrant 185. Further logic in radio controller 172 may then be used to determine, at any particular point in time, which grouping to use in providing consolidated location-dependent information to any one or more of SUs 110-126.

In still further embodiments, SUs may be grouped intelligently based on their location such that clusters of SUs located within a threshold maximum geographic range of one another are automatically grouped into an arbitrarily and dynamically created group. For example, SUs 120-126 may be determined to be within a maximum range of 0.5 miles of each other, and automatically joined into a cluster group 160. Similar clusters of SUs could be identified and grouped together as well (e.g., independent of talkgroup membership). In a similar manner, a system administrator may specify a number of groups or clusters that SUs should be divided into, and logic in the radio controller may determine a "best fit" (minimum of squared distances between each SU and the centroid of its chosen group) of the number of specified groups to SUs operating at the radio site. Other methods of identifying groups of SUs could also be used.

At step 404, the radio controller determines, using the geographic location data of each SU in each group, a single representative geographic location for each group of SUs. In one embodiment, the representative geographic location may be an average geographic location of all SUs in the group. For example, in an embodiment in which the radio controller 172 of FIG. 1 groups all SUs 120-126 of talkgroup 160 into a group, an average geographic location may be calculated at point 127 and may be used as the representative geographic location of the talkgroup 160 for the purpose of retrieving location-dependent information for SUs in the group. The average geographic location point 127 may be calculated by, for each SU 120-126 in the talkgroup 160, converting a latitude and longitude coordinate pair provided by each SU 120-126 to Cartesian coordinates, averaging all of the Cartesian coordinates to obtain an average Cartesian coordinate, converting the average Cartesian coordinate to an average latitude and longitude coordinate pair, and using the average latitude and longitude coordinate pair as the representative geographic location of the talkgroup 160. In this example, the representative geographic location is not the location of the BS 102 and is different from the geographic location of each SU 120-126 in the talkgroup 160. A similar representative geographic location 141 may be calculated for talkgroup 162 in a same or similar manner. Other mathematical methods of calculating a representative geographic location may be used as well, including the use of spherical or cylindrical coordinate systems.

In another embodiment in which the radio site 104 is divided into a plurality of quadrants 184-187, and SUs grouped by quadrant, a representative geographic location 227 may be calculated for a group of SUs 110-126 representing all SUs in the northwest quadrant 185 of radio site 104. In a further embodiment in which the radio site 104 is divided into a plurality of sectors 193-195, and SUs grouped by sector, a representative geographic location 242 may be calculated for a group of SUs 140-150 representing all SUs in the south eastern sector 195 of radio site 104.

Of course, other methods of determining or calculating a representative geographic location could be used as well, such as selecting a median SU (e.g., an SU located at a median geographic location amongst all other SUs in the group) within each group and using the determined geographic location of the median SU as the representative geographic location of the group. In still another example, a representative sample (perhaps based on a threshold minimum number of SUs, but not all SUs in a group) of SUs determined to be of higher priority, determined to be requesting location-dependent information more often than other SUs in the group, or based on some other parameter may be selected and a representative geographic location calculated based on the mean or median location of the SUs in the representative sample. Other possibilities exist as well.

Steps 402 and 404 may be executed on an on-going basis at the radio controller, or may be executed only responsive to a request from a SU for location-dependent information, among other possibilities.

At step 406, the radio controller, on behalf of each group of SUs, transmits one or more corresponding requests for location-dependent information to a content provider using the representative geographic location(s). For example, and as set forth in FIGS. 1 and 2, the request may be transmitted to an externally maintained and accessible content provider 176 via a WAN 174, which may be the Internet. One request for location-dependent information may be transmitted per group, or the radio controller 172 may aggregate all of the groups' requests into a single request for location-dependent information, and transmit the single request to content provider 176. In an alternative embodiment, not shown, content provider 176 may be positioned within the system infrastructure 170, and may be accessible to radio controller 172 via a local area network (LAN).

The content provider, and the location-dependent information being requested, may include, for example, weather data (including historical weather data, current weather data, and forecast weather data, etc.), traffic data (including traffic congestion, known incidents, known construction sites or lane closures, etc.), services available near the representative geographic location (including gas stations, hotels, restaurants, police, fire, etc.), and events occurring near the representative geographic location (including police events such as a warrant presentation, APBs, and Amber alerts, traffic events such as accidents, civilian aid requests, public events such as fairs and carnivals, etc.). In the event that the content provider provides multiple types of location-dependent information, the request transmitted to the content provider by the radio controller may indicate what type of location-dependent information is being requested.

The radio controller may be further configured, in some embodiments, to make periodic or intermittent requests for updated location-dependent information at a first pre-determined frequency using the determined representative geographic location(s) for further re-broadcast within the RF coverage area at a second pre-determined frequency. For example, for location-dependent information that changes more quickly, requests for updated location-dependent information may be made by the radio controller more often. In the context of weather data, updated current condition information may be automatically requested from the content provider by the radio controller at a first frequency (e.g., every 1-30 minutes), while updated daily forecast information or sunrise/sunset information automatically requested by the radio controller at a longer second frequency (e.g., every 1-8 hours). Updated location-dependent information may then be cached at the radio controller until requested by a SU or group member associated with a particular representative geographic location to which the updated location-dependent information is associated, or may be provided immediately to the SUs/group members via an immediate (or next available) broadcast via their serving BS.

The content provider, responsive to receipt of the request, may access a database of location-dependent information, using the provided representative geographic location, and provide corresponding content relative to the representative geographic location back to the radio controller. The content provider may provide the requested information back to the radio controller in a same or similar manner to which it was requested, e.g., in separate responses or in an aggregated response. In the event that multiple requests were made using separate representative geographic locations, but the content provider determines that a same location-dependent information response can satisfy both requests, a single response containing the location-dependent information may be provided to the radio controller with an indication that the information is responsive to both of the separate requests.

Similar to steps 402 and 404, step 406 may be executed on an on-going basis at the radio controller, or may be executed only responsive to a request from a SU for the location-dependent information. For example, the radio controller may be configured to continuously execute steps 402-406 with respect to certain location-dependent information and cache the information at the radio controller so that updated location-dependent information can be provided quickly and efficiently to SUs in their corresponding radio site. In other embodiments, step 406 may be initially executed only responsive to a request from a SU for location-dependent information, but the radio controller may be configured to subsequently obtain updated location-dependent information at a pre-configured frequency, independent of any subsequent requests by SUs in the group corresponding to the initial location-dependent information request.

Once the radio controller receives the response from the content provider, at step 408, it causes the received location-dependent information to be broadcast within the RF coverage area of the serving BS, immediately or at a next available opportunity. In one example with respect to FIGS. 1 and 2, the received location-dependent information is provided to BS 102, along with the representative geographic location(s) used to retrieve it, and is broadcast across all of radio site 104 on a trunked control or rest channel, trunked traffic, or conventional (non-trunked) channel accessible to the SUs in the group(s) associated with the representative geographic location. In the event a respective channel is currently occupied by a voice and/or data transmission, the broadcast may be delayed until the transmission is completed or may be embedded within the voice and/or data transmission.

In an embodiment in which radio site is physically divided into sectors, quadrants, or some other quantity, the radio controller will cause the location-dependent information to be broadcast on the channel associated with the corresponding physically divided sector, quadrant, or other quantity. For example, if a separate channel is provided for quadrant 185 of FIG. 2, location-dependent information retrieved from content provider 176 for SUs 110-126 using representative geographic location 227 may be provided on a corresponding respective physical channel associated with quadrant 185.

In one embodiment, SUs may be configured to look for location-dependent information broadcast by their serving BS accompanying representative geographic locations, and retrieve and store the location-dependent information that has a representative geographic location located closest to their determined current geographic location.

For example, and with reference to FIG. 2, assuming the BS 102 broadcasts location-dependent information relative to representative geographic location 227, and SU 110 detects the broadcast on a channel it is monitoring, it will determine if the representative geographic location is closer to it than any previously provided location-dependent information (or if the representative geographic location is the same but the broadcast includes updated location-dependent information relative to previously received location-dependent information available at the SU), and if it is closer or the information is more recent, may update the location-dependent information at the device with the received updated location-dependent information. If the BS 102 then subsequently transmits location-dependent information tagged with a representative geographic location closer to SU 110's current geographic location, it may update the location-dependent information at the device with the received updated location-dependent information. Included in location-dependent information broadcasts by BS 102 may be a timestamp indicating a time at which the location-dependent information was retrieved from a content provider such as content provider 176 of FIGS. 1 and 2, to allow receiving SU's to make a further educated decision of whether to update the location-dependent information at the device with the received updated location-dependent information.

In a further example, SUs may be configured to look for location-dependent information broadcast by BS 102 that contains a group identifier associated with one of their subscribed talkgroups. For example, and with reference to FIG. 2, assuming the BS 102 broadcasts location-dependent information tagged with a talkgroup identifier associated with talkgroup 160, SUs 120-126 may be configured to retrieve and process the location-dependent information in the broadcast with or without further processing and considering representative geographic location information that may or may not be broadcast along with the location-dependent information. In this scenario, SUs in talkgroup 160 may again consider timestamp information contained in the broadcast that is indicative of a retrieval time and/or date from the content provider, and only update locally stored location dependent information if the broadcast indicates updated location dependent information relative to the locally stored information (perhaps, again, by comparing timestamps). In some embodiments, the radio controller may dynamically assign SUs to new (perhaps temporary) talkgroups solely for the purpose of distributing the location-dependent information. For example, assuming SUs 110-126 belong to a first talkgroup (not shown), radio controller may separately assign a second talkgroup identifier (e.g., 160) to SUs 120-126 solely for the purpose of distributing location-dependent information to SUs 110-126. The radio controller notifies SUs 120-126 of their assignment to the new (perhaps temporary) talkgroups solely for the purpose of distributing the location-dependent information so that they can monitor and retrieve location-dependent information broadcast by BS 102 and intended for receipt by SUs 120-126.

In the example of FIG. 2, and assuming the radio system 200 is a trunked radio system, the retrieved location-dependent information may be caused to be periodically or intermittently broadcast by BS 102 on a control (or rest) channel assigned to the BS 102 when idle space becomes available on the control channel. Alternatively, and assuming the radio system 200 is a conventional radio system, the retrieved location-dependent information may be caused to be periodically or intermittently broadcast by BS 102 on a conventional (non-trunked) channel assigned to the BS 102 when idle space becomes available on the conventional channel.

FIG. 5 sets forth a message flow diagram 500 that illustrates one example of messages that may flow between a radio controller 570 (such as radio controller 172 of FIGS. 1 and 2), SUs 572 (such as SUs 110-150 of FIGS. 1 and 2), and a content provider 574 (such as content provider 176 of FIGS. 1 and 2) to consolidate location-dependent information in a radio access network.

First, SUs 572 transmit location information 502 to radio controller 570 via their serving BS. In other embodiments, the serving BS, perhaps in conjunction with one or more other BSs within transmission range of the SUs 572, may determine each SU's geographic location.

At step 504, the radio controller 570 processes the location information and stores the location information for each of the SUs 572. Also at step 504, the radio controller 570 may segregate the SUs 572 operating within an RF coverage range of the serving BS into one or more groups, based perhaps on location, talkgroup membership, or some other parameter or algorithm or combination thereof. Finally, and still at step 504, for each group of SUs 572 identified by the radio controller 570, the radio controller 570 determines a single representative geographic location and stores the single representative geographic location associated with each group.

Subsequently, one or more SUs 572 may optionally transmit a request 506 for location-dependent information, such as for weather, traffic, or event information, among other possibilities. At step 508, the radio controller 570 processes the one or more location dependent information requests. The radio controller 570 may, at step 508, store the request(s), aggregate the request(s), and/or generate one or more content-provider requests responsive to receiving the one or more location-dependent information request(s) 506. In other embodiments, the radio controller 570 may be configured to automatically, and perhaps at a periodic or intermittent interval, request certain types of preconfigured location-dependent information responsive to receiving the location information 502 (and without receiving specific requests for location-dependent information), and either cache the retrieved location-dependent information locally at radio controller 570 until requested by one of the SUs 572, or provide the retrieved location-dependent to the serving BS for broadcast to the SUs 572 independent of any request for the location-dependent information from SUs 572.

In any event, the radio controller 570 then transmits a single request 510 for location-dependent information to content provider 574. Included in the request 510 is at least one representative geographic location determined by the radio controller 570 at step 504. In one embodiment, the request 510 is an aggregated request including a plurality of representative geographic locations. In another embodiment, and as illustrated by optional location dependent information requests 512-514, separate requests may alternatively be made by radio controller 570 to content provider 574 for each of a plurality of representative geographic locations.

At step 516, the content provider 574 processes the one or more requests for location-dependent information, retrieves information responsive to the requests, and provides corresponding responsive information via location-dependent information response 518 (for a single or aggregated location-dependent information response) and optional additional location-dependent information responses 520-522 (for separate location-dependent information responses).

At step 524, the radio controller 570 processes the location-dependent information response(s) 518-522, and stores the location-dependent information response(s) locally. Subsequently, radio controller 570 causes the location-dependent information response information to be provided to the SUs 572 via the corresponding serving BS and location-dependent information broadcast 526 (for a single or aggregated broadcast of location-dependent information and corresponding representative geographic locations) and/or additional optional location-dependent information broadcasts 528-530 (for separate broadcasts of location-dependent information and corresponding representative geographic locations).

Broadcast 526 and/or broadcasts 528-530 may be initiated by radio controller 570 in response to receiving a request for location-dependent information from one or more of the SUs 572, at a pre-configured periodic or intermittent interval that is perhaps dependent on the type of location-dependent information being broadcast. For example, and consistent with the foregoing description, some types of weather data (such as current weather conditions and sunrise/sunset information) may be caused to be broadcast to SUs 572 at an increased frequency or interval compared to other weather data (such as a weather forecast).

Subsequently, radio controller 570 may periodically or intermittently transmit one or more location-dependent information update requests 534 to content provider 574 to update the location-dependent information previously received in transmission 518 and/or transmissions 520-522. Again, the pre-configured periodic or intermittent interval at which the update requests 534 are transmitted to content provider 574 may depend on the type of location-dependent information being managed by radio controller 570 in a manner similar to the frequency of broadcast 526 and broadcasts 528-530. Update request(s) 534 may request a same set of information as original request 510 and/or requests 512-514 (perhaps using the same one or more representative geographic locations or updated/recalculated representative geographic locations in the event that SUs 572 have moved) or a subset of the information relative to the original request 510. Once updated location-dependent information is received at the radio controller 570, the updated information may be provided to SUs 572 in updated broadcasts (not shown).

At step 532, the SUs 572 receive the broadcast location-dependent information and, consistent with the considerations set forth in step 408 of FIG. 4, adopt or refrain from adopting the broadcast location-dependent information. Adopting the broadcast location-dependent information may include displaying the location-dependent information via a display, playing back the location-dependent information via a speaker, or storing or caching the location-dependent information at the SU until requested by a user or other application function.

III. Conclusion

In accordance with the foregoing, a method and device are disclosed that allows for consolidation of location-dependent information in a radio access network, saving power, resources, and costs while providing valuable and more accurate location-dependent information to groups of subscriber units at a time. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for consolidating location-dependent information in a two-way radio system, the method comprising:
   determining a geographic location of each subscriber unit in a group of subscriber units active within a radio frequency (RF) coverage area of a base station (BS);
   determining a single representative geographic location for the group of subscriber units as a function of the geographic locations of each subscriber unit in the group;
   requesting, from a content provider, location-dependent information using the representative geographic location; and
   causing the location-dependent information to be broadcast to the subscriber units in the group within the RF coverage area.

2. The method of claim 1, wherein determining the geographic location of each subscriber unit in the group comprises receiving, from each subscriber unit in the group, location coordinates identifying the geographic location of the respective subscriber unit.

3. The method of claim 1, the method further comprising:
   dividing the RF coverage area of the BS into a plurality of sectors or quadrants;
   grouping each subscriber unit into a corresponding sector-group or quadrant-group corresponding to the sector or quadrant in which it is currently operating;
   determining, for each sector or quadrant, a single representative geographic location for the sector-based or quadrant-based group of subscriber units based on the geographic locations of each subscriber unit in each sector or quadrant;
   requesting, from a content provider, sets of location-dependent information using each determined representative geographic location for each sector-based or quadrant-based group; and
   causing each set of location-dependent information to be broadcast within each respective sector or quadrant.

4. The method of claim 1, wherein the location-dependent information is one of: weather data, traffic data, and services available near the representative geographic location.

5. The method of claim 1, wherein the group of radios are members of a same talkgroup.

6. The method of claim 1, wherein causing the location-dependent information to be broadcast comprises causing to be broadcast (i) corresponding content retrieved from the content provider using the representative geographic location and (ii) the representative geographic location.

7. The method of claim 6, wherein causing the location-dependent information to be broadcast further comprises causing to be broadcast a timestamp indicating a time when the location-dependent information was retrieved from the content provider.

8. The method of claim 1, wherein the broadcasting of the location-dependent information is provided only responsive to a detected request for the location-dependent information from one of the subscriber units in the group.

9. The method of claim 1, wherein the representative geographic location is an average geographic location determined as a function of the geographic location of each subscriber unit in the group.

10. The method of claim 9, wherein the average geographic location is determined by:
    for each subscriber unit in the group, converting a latitude and longitude coordinate pair provided by the subscriber unit to Cartesian coordinates;
    averaging all of the Cartesian coordinates to obtain an average Cartesian coordinate;
    converting the average Cartesian coordinate to an average latitude and longitude coordinate pair; and
    using the average latitude and longitude coordinate pair as the representative geographic location.

11. The method of claim 1, wherein the representative geographic location is not the location of the BS and is different from the geographic location of each subscriber unit in the group.

12. The method of claim 1, wherein the content provider is located in a system infrastructure of the two-way radio system and is accessible via a local area network, or is located external to the two-way radio system and is accessible via a wide area network.

13. The method of claim 12, wherein additional requests for updated location-dependent information are requested at a first pre-determined frequency using the representative geographic location and are caused to be re-broadcast within the RF coverage area at a second pre-determined frequency.

14. The method of claim 12, wherein the content provider is located external to the two-way radio system and accessible via the wide area network.

15. The method of claim 13, wherein the pre-determined frequency varies as a function of a determined type of the location-dependent information.

16. A two-way radio system infrastructure device for consolidating location-dependent information in a two-way radio system, the device comprising:
    a memory;
    a transceiver; and
    a processor configured to:
        determine a geographic location of each subscriber unit in a group of subscriber units active within a radio frequency (RF) coverage area of a base station (BS);
        determine a single representative geographic location for the group of subscriber units as a function of the geographic locations of each subscriber unit in the group;
        request, from a content provider, location-dependent information using the representative geographic location; and
        cause the location-dependent information to be broadcast to the subscriber units in the group within the RF coverage area.

17. The device of claim 16, wherein determining the geographic location of each subscriber unit in the group comprises receiving, from each subscriber unit in the group, location coordinates identifying the geographic location of the respective subscriber unit.

18. The device of claim 16, wherein the representative geographic location is not the location of the BS and is different from the geographic location of each subscriber unit in the group.

19. The device of claim 16, wherein the representative geographic location is an average geographic location determined as a function of the geographic location of each subscriber unit in the group.

20. The device of claim 16, wherein the content provider is located in a system infrastructure of the two-way radio system and is accessible via a local area network, or is located external to the two-way radio system and is accessible via a wide area network.

* * * * *